(No Model.)
J. McFARLAND.
AUTOMATIC WATERING TROUGH FOR ANIMALS.
No. 538,690. Patented May 7, 1895.
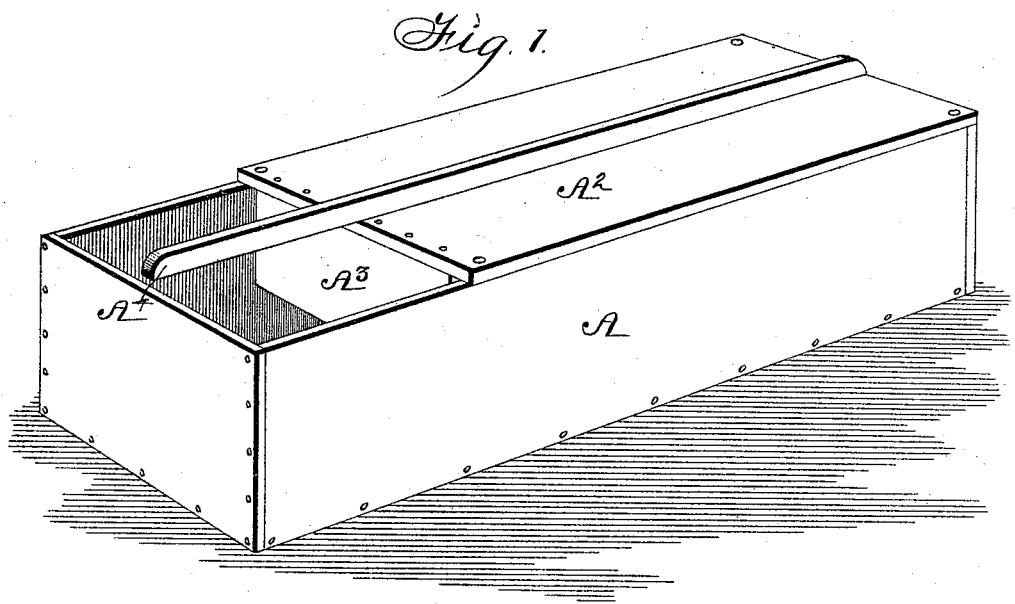
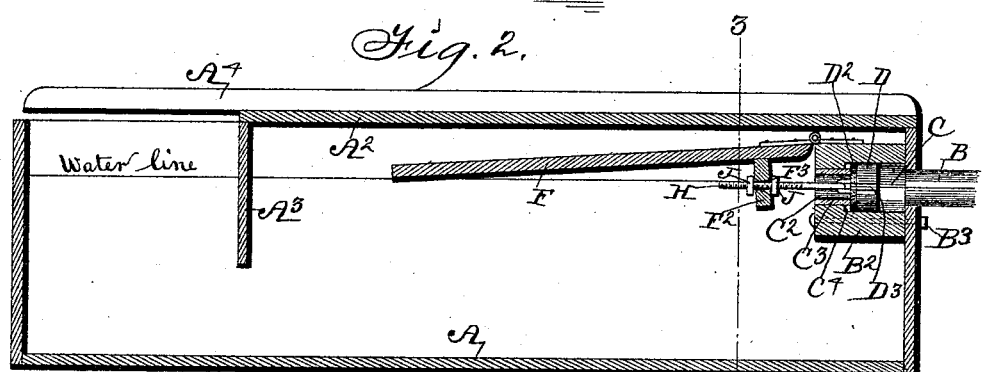
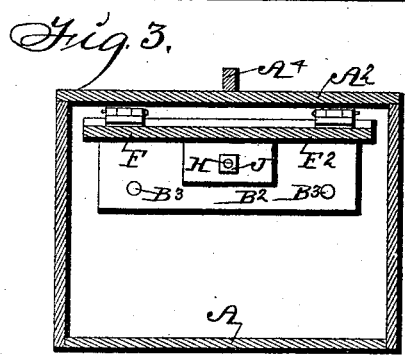
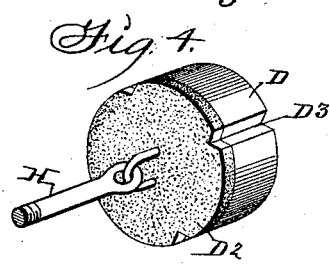
Witnesses:
W. J. Sankey.
R. H. Orwig.
Inventor: John McFarland,
By Thomas G. and J. Ralph Orwig, Attorneys.

UNITED STATES PATENT OFFICE.

JOHN McFARLAND, OF DEDHAM, IOWA.

AUTOMATIC WATERING-TROUGH FOR ANIMALS.

SPECIFICATION forming part of Letters Patent No. 538,690, dated May 7, 1895.

Application filed July 13, 1894. Serial No. 517,403. (No model.)

*To all whom it may concern:*

Be it known that I, JOHN MCFARLAND, a citizen of the United States, residing at Dedham, in the county of Carroll and State of Iowa, have invented an Improved Automatic Watering-Trough, of which the following is a specification.

The objects of this invention are first, to produce an improved valve of a cheap and durable construction and simple and readily adjustable means for connecting the same with a float so that the water level may be automatically maintained at any desirable height.

My invention consists primarily in the construction of the valve, and further in the construction, arrangement and combination therewith of the means for automatically adjusting the float so as to regulate the water level, as hereinafter set forth, pointed out in my claim and illustrated in the accompanying drawings, in which—

Figure 1 is a perspective view of the complete trough. Fig. 2 is a longitudinal sectional view taken along a central line. Fig. 3 is a transverse sectional view taken through the line 3 3 of Fig. 2, and Fig. 4 is a perspective view of the valve.

Referring to the accompanying drawings the reference letter A is used to indicate a watering trough which may be of any desirable size or shape. One end of the box is provided with a cover $A^2$ and a partition $A^3$ is attached to the inner end of said cover to project downwardly into the box and keep out all foreign substances from the interior of the trough. $A^4$ is a guard projecting across the center of the open end of the trough to keep animals from standing in the trough, &c.

B indicates a supply pipe leading from a tank or other suitable source of supply.

$B^2$ indicates a rectangular block adapted to be clamped to the end of the trough to surround the supply pipe, by means of bolts $B^3$. This block has a longitudinal bore C leading from its outer end inwardly and a smaller bore $C^2$ forming a continuation of the same and leading to the opposite end of the block, a pipe section $C^3$ being extended through said bore $C^2$ to a point a slight distance into the larger bore thus leaving an annular space $C^4$ around the inner end of the pipe $C^3$.

D indicates a disk shaped block having a flexible facing $D^2$ and a number of notches $D^3$ formed in its periphery of a depth corresponding to the thickness of the annular space $C^4$, so that when the disk is drawn tight against the pipe $C^3$ a water tight connection is formed and when moved outwardly the water will be permitted to flow through said notches and through the pipe $C^3$.

F indicates a float hinged to the block $B^2$ and having a downward projection $F^2$ near its hinged end, said projection having a bore $F^3$ formed therein.

H indicates a screw threaded rod having its one end pivotally attached to the block D and its other end passed through the bore $F^3$.

J J indicate nuts placed on said screw threaded rod on opposite sides of the projection $F^2$ so that the float may be made to close the valve when in any position, thereby providing means whereby the height of the water in the vessel may be regulated.

Having thus described my invention, what I claim as new therein, and desire to secure by Letters Patent of the United States therefor, is—

An improved stock watering trough, comprising a suitable receptacle, a supply pipe leading thereto, a block detachably connected with said receptacle and having a large and small bore therein in alignment with each other, a pipe section passed through the smaller bore and a slight distance into the larger bore a circular block in the larger bore having a number of notches in its periphery a yielding front surface on said block a screw-threaded rod pivotally attached to the block, a float hinged to the aforesaid block, a projection extended downwardly therefrom having an opening therein to admit said rod and nuts on said rod on opposite sides of the said projection, all arranged and combined, substantially as and for the purposes stated.

JOHN McFARLAND.

Witnesses:
 J. G. CATON,
 LYNN CATON.